Dec. 13, 1966 R. S. BARTON 3,292,152

MEMORY

Filed Sept. 17, 1962 2 Sheets-Sheet 1

INVENTOR.
ROBERT S. BARTON
BY
Christie, Parker & Hale
ATTORNEYS

Dec. 13, 1966 R. S. BARTON 3,292,152

MEMORY

Filed Sept. 17, 1962 2 Sheets-Sheet 2

A - READ FROM SLOW SPEED MEMORY 10

B - READ FROM HIGH SPEED MEMORY 11

C - EXCHANGE CONTENTS OF REGISTERS 12 & 14 WITH REGISTERS 13 & 18

D - WRITE INFORMATION DERIVED THROUGH STEP "A" INTO HIGH SPEED MEMORY 11

E - WRITE INFORMATION DERIVED THROUGH STEP "B" INTO SLOW SPEED MEMORY 10

INVENTOR.
ROBERT S. BARTON
BY
Christie, Parker & Hale
ATTORNEYS

United States Patent Office 3,292,152

Patented Dec. 13, 1966

3,292,152

MEMORY

Robert S. Barton, Altadena, Calif., assignor to Burroughs Corporation, Detroit, Mich., a corporation of Michigan Filed Sept. 17, 1962, Ser. No. 223,919
3 Claims. (Cl. 340—172.5)

This invention relates to a memory and more particularly to an associative or "tag" memory.

Digital computer logic components have been developed to exhibit very high speeds and have reached the point where the speeds with which information may be processed by a digital computer are limited by these memory speeds. Many systems have been proposed for reducing the high logic-to-memory speed ratios by utilizing a plurality of memories and sequencing the memories to give an over-all higher memory speed. Most of these proposals have achieved an increase in memory speed only through the utilization of very complex techniques and a large number of components.

The associative type memory of the present invention is organized to receive and store information in a "stacked" fashion through the use of a usage indicator. The conventional associative type writing sequence is modified in accordance with the present invention whereby each memory location is provided with a usage indicator and which usage indicators are utilized with a pointer to indicate the availability of a memory location or the last memory word that has been used and is available to be transferred therefrom. The reading cycle of the associative memory is the conventional simultaneous comparison of all the "tags" or word identification portions of the information stored in the memory proper.

These and other features of the present invention may be more fully appreciated when considered in the light of the following specification and drawings, in which.

Figure 1:
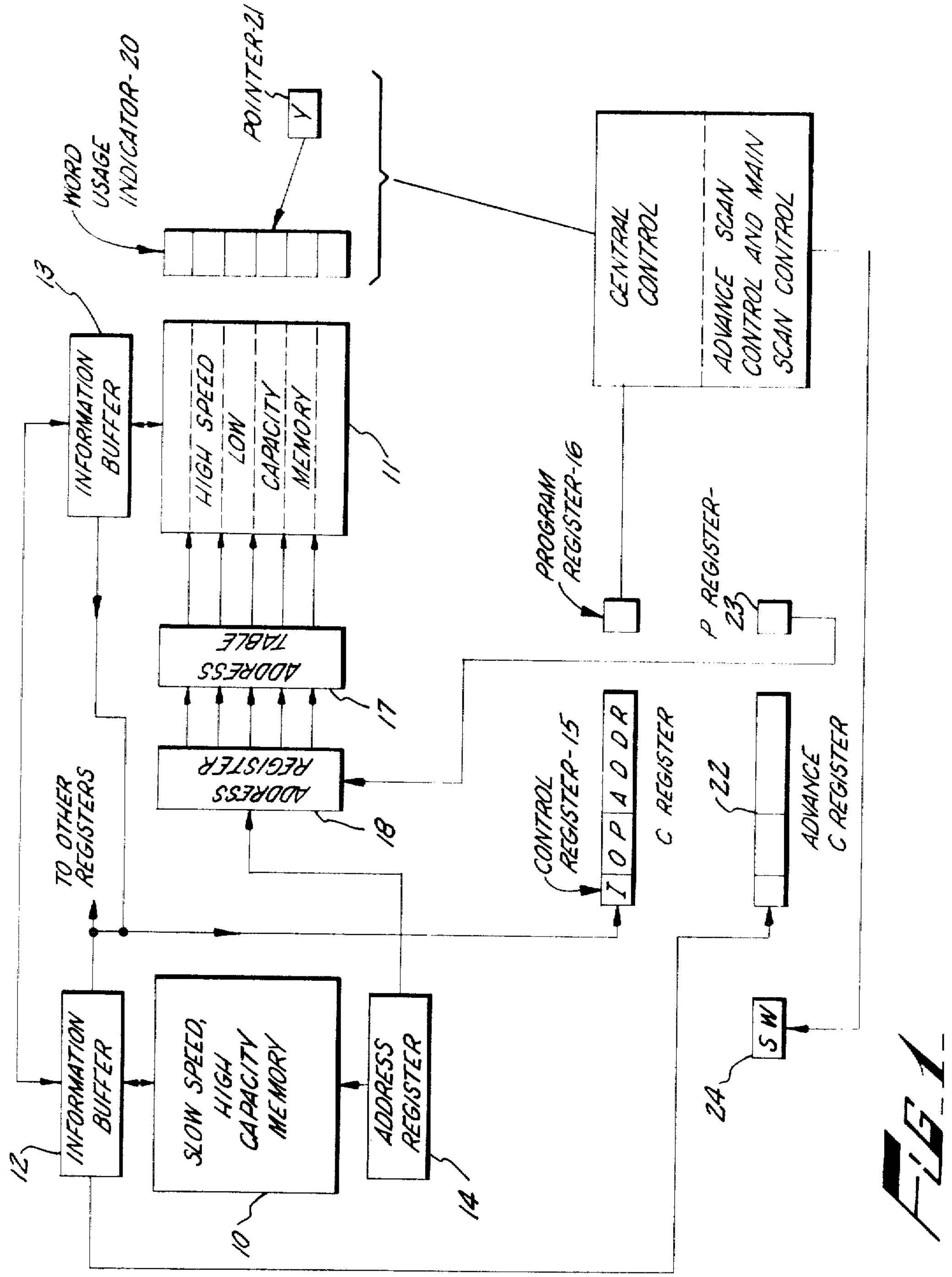
FIG. 1 is a block diagram of the memory system embodying the invention.

Now referring to the drawings the invention will be described as it may be incorporated in a stored program digital computer having an operational cycle comprising a fetch phase and an execute phase. The description and drawings have been simplified to principally limit the description to the fetch phase of the operational cycle since it is only desired to locate the required instruction and the data for that instruction in the memory having the low access time or of high speed for use during the execute phase and also since the execute phase is conventional.

It will be recognized by those skilled in the art that during the fetch phase of the operational cycle the instructions are transferred from memory in a preselected sequence and stored in a control register. During the execute phase, if an operand is required for the execution of the particular instruction in the control register, it is first obtained from the memory and then the instruction is executed. In a single address machine, therefore, at least one and at most two memory accesses are required for each instruction to be executed. It is the aim of this invention to locate all instructions and operands in the high speed memory as they are about to be used to materially reduce the memory access times. Although the invention may be employed with any digital computer, it will be described as it may be employed in the digital computer commercially available from the Burroughs Corporation of Detroit, Michigan, and which computer is identified as the Burroughs 220 System.

The invention will be described in terms of the single address instruction format for the Burroughs 220 System and which format has the following general form:

I Op Addr

The Op-field of the instruction determines the operation that is to be performed by the computer. The Addr-field specifies the memory location containing the operand associated with the operation Op. Some instructions explicitly designated the contents of certain registers as operands and in these cases the Addr-field is not used for operand location. The I-field is that portion of the control field that identifies whether or not the contents of the index register is to be used to increment the Addr-field of the instruction in the control register.

The only operations of the Burroughs 220 System that will be considered for the purposes of this invention are arithmetic, fetch and store, register loading and shift, and branching operations of either a data dependent or conditional branch or a data independent or unconditional branch.

The memory system of the present invention comprises a relatively slow speed, high capacity memory 10 and a high speed, low capacity memory 11 and which memory 11 is preferably an associative type memory. The usage of the term "speed" as applied to the memories employed herein is considered to be the access time or time for obtaining information from the memory. To this end, the slow speed memory may be a conventional coincident current magnetic core memory that has a large capacity in the sense that it can store a large number of words. To this same end, the high speed or low access time for the memory 11 may be obtained by constructing a conventional memory in terms of thin films. Each of the memories is provided with conventional information buffers, such as the information buffer register 12 for the memory 10 and the register 13 associated with the memory 11. The conventional means for reading out of or writing into a particular location in the memory 10 is merely represented as an address register 14 since this is the important information required for reading and writing. In addition, the conventional control register, which is generally referred to as a C register in the 220 System, is organized to received the instructions in a parallel-serial mode in the general order shown for the instruction format hereinabove. Accordingly, the control register 15 stores the operation field, Op, as well as the address field, Addr, and the index field, I, in the order shown. The control register 15 is associated with a program counter 16. The program counter 16 is utilized to store the address of the memory location from which the next instruction will be selected for execution. It will be recognized by those skilled in the computer art that with the exception of the high speed memory 11 the structure described hereinabove for performing the fetch phase of the operational cycle is conventional. Initially, the memory 10 stores all the information and the associative memory 11 is empty.

The high speed memory 11 is a modified associative type memory and includes an address table 17 or word identification storage portion for storing the tags or word identification portion associated with the memory word stored in the memory 11. The word identification portions of each word for the purposes of this invention comprises the address of the associated word in the slow speed memory 10. This address, however, as in conventional associative memories, does not necessarily relate to the physical location of the associated word in the memory 11 which stores the words. In addition, an address or compare register 18 for receiving the word identification information is coupled to the address table 17 to allow the table to be searched in a parallel fashion to determine the presence or absence of a word in memory 11.

The associative type memory 11 utilized in the invention has been modified to operate in conjunction with a word usage indicator 20. The usage indicator 20 comprises an individual bistable storage indicator for each word in the memory 11 and a Y pointer 21. The bistable storage elements are normally arranged to be set into an "ON" state and when a word is entered into the memory 11 they are controlled to be switched to an "OFF" state and after the word has been read out of the memory 11 for use in the execute phase of the operational cycle the corresponding element is reset to the "ON" state. The "ON" state, therefore, indicates that a memory position has been used or, in the initial state of the memory, that the memory position is empty.

The Y pointer 21 may comprise a cycling digital counter which initially points to a relative location zero in the memory 11 and is controlled to be counted up until it points to the memory position that is identified as being "ON." When a word is written into the memory 11, it is written into the memory position pointed to by the Y pointer 21. Of course, if all the memory positions are identified as being "OFF," the writing of further information is halted. It should therefore be appreciated that the writing into the associative memory 11 has been modified from the conventional associative memory operation in that the conventional operation does not include the use of the word usage indicator 20 to control the location of the words written into the memory. In reading out of the associative memory 11, however, the conventional associative technique is utilized in that the word is directly read out once it is located in the memory by means of the parallel comparison afforded by the address table 17. An associative type of memory known as a "tag" memory that may be utilized in the invention is described in the copending application entitled "Storage Apparatus," bearing Serial No. 780,056, filed on December 12, 1958, and assigned to the same assignee as the present invention.

It should also be understood that only one copy of any word exists in the memory system at any one time and, therefore, it must be found in either the slow speed memory 10 or the high speed memory 11. Since all the information is initially stored in the slow speed memory 10, when a word is read out of the slow speed memory 10 it is not regenerated or written back therein due to the amount of time that this operation normally requires but, instead, is written into the high speed memory 11. To this same end, any word read out of the high speed memory 11 is regenerated or written back into the high speed memory. A memory cycle for the memory 10 then comprises the time required to read a word out of the memory and to write it into the memory 11. Similarly, the memory cycle for the memory 11 comprises the time required to read out a word from the memory and to write this word back in the memory.

The memory 11 has associated therewith another control register 22 and a program counter 23 that are respectively similar to the control register 15 and program counter 16. These elements are further identified as the advance scan control register and the advance scan program counter and are utilized to control the information to be written into the high speed memory 11 in anticipation of subsequent instructions to be executed. This anticipation feature will be referred to as the advance scan phase of the fetch phase as distinguished from the conventional fetch which may be further identified as main scan. The remaining element utilized for advance scan is a bistable element identified as a switch 24. The state of element 24 indicates whether the next word to be inserted into the high speed memory 11 is an instruction or data (operand). It will be recalled that during the normal execute phase that an operand may be required to be fetched and therefore this operand should be transferred to the high speed memory 11 to be available for this purpose. When the switch is arranged in a zero state, for example, it will indicate that an instruction is to be inserted into the memory 11 while when it is in its one state it indicates that data is to be inserted.

The central control means of the computer will include a main and an advance scan control section for controlling the transfer of information. To this end, the information is controlled by this control means to initiate the reading and writing operation in a conventional timed relationship and to transfer it to the appropriate registers. In addition, the control means provides the control pulses for switching the states of the usage indicator 20 includin both the bistable elements thereof and the Y pointer 21, the switch 24, and the program counters 16 and 23.

With the above structure in mind, the main and advance scan operation will be described starting with the main scan. The main scan operational procedure can be best described in terms of the running of some program, and it will be assumed that the next instruction to be executed in this program is instruction J. The address of this instruction, then, is identified by the program counter 16 and the control means will transfer the contents of the control program counter 16 to the address registers 14 and 18. First, the high speed memory 11 is interrogated to determine the presence or absence of instruction J therein. This is accomplished by simultaneously comparing all the addresses in the address table 17 with the address of instruction J now being stored in address register 18. If the instruction is found in the high speed memory 11 it is automatically read out into the information buffer 13 and from the information buffer 13 to the designated register. If the instruction J is not found in the high speed memory 11, then the instruction is read out of the slow speed memory 10 into the information buffer 12 and from the information buffer 12 to the appropriate registers for processing. This, then, terminates the conventional fetch phase of an operational cycle. If during the execution of an instruction and operand is required, then the address of this operand is generally obtained from the address section of the control register 15 and is transferred to the address register 14 as well as the address register 18 and the steps described hereinabove for fetching information from the memories 10 or 11 will be repeated.

It should be noted that the information read out of the high speed memory 11 into the information buffer 13 is not available for processing until the complete memory cycle has been terminated, namely, the information is regenerated in memory. To this same end, when the information is read out of the slow speed memory 10 it is not regenerated therein but is, along with its address, transferred to the information buffer 13 and the address register 18 associated with the high speed memory 11 and then written into this memory. This step is necessary since, as mentioned hereinabove, only one copy of information is found in the memory system and upon reading it out of the slow speed memory 10 it is desired to take advantage of the high speed characteristics of the high speed memory 11 and to write this information into the high speed memory and thereby prevent the loss of any information. The timing for the reading and writing into the memories 10 and 11 is controlled by the central control as indicated by the timing chart of FIG. 2.

During the execution of each instruction there is a finite amount of time during which the memory system is not being used for execution of the instruction. This amount of time varies with the type of instruction, being the largest for arithmetic instructions and the smallest for register instructions and the like. It is during this interval that the advance scan cycle operates on the memories to anticipate the needs of the main scan phase and place the necessary information into the high speed memory 11. The anticipation of the main scan needs is governed by the usual sequential operation of the program steps and, accordingly, the advance scan seeks out and places the next program step in the high speed memory 11. If the information sought is already in the high speed memory 11, then its usage indicator is merely turned "OFF." It will be recognized that when the amount of time required to execute a particular instruction is large it is possible for the advance scan phase of the memory cycle to insert several instructions and their associated operands into the high speed memory 11. The function of the advance scan control register 22 and the advance scan counter 23 is to keep track of the progress of the advance scan. The advance scan control register 22 is utilized to store the last instruction which was inserted into the high speed memory 11 and its address, while the advance scan counter 23 stores this same address incremented by one. Thus the address of the next piece of information to be fetched during the advance scan phase is specified by the address field of the advance scan control register 22 or by the advance scan counter 23, depending on the type of instruction contained in the Op field of the register 22. The rules governing the operation of the advance scan phase of the memory cycle are given in Table I.

the information is transferred from the slow speed memory 10 to the high speed memory 11 until the high speed memory 11 is filled to its capacity. Under these conditions, then, further use of the high speed memory 11 requires the removal of information therefrom to the slow speed memory 10. With the high speed memory 11 in this state it then becomes necessary to select the information that is to be transferred out of the high speed memory 11 to allow other information to be placed therein from the slow speed memory 10. To this end, the only information that is desired to be removed from the high speed memory 11 is that information that has been used. This, then, indicates that advance scan will not go forward if the high speed memory 11 is filled up with all information that has not been used. Furthermore, the information that is to be read out of the high speed memory 11 should preferably be not only information that has been used but the information that has been retained in the high speed memory 11 for the longest period of time. Specifically, the term longest has reference to the use of the information in a program step, that is, information that has been used in the earliest program steps executed.

*Table I*

| Type of Instruction in Register 22 | SW 24 | I (Index Digit) | Action Performed |
|---|---|---|---|
| Arithmetic Fetch or Store (Non-Branching) | 0 | Even or Odd | Insert the instruction addressed by Advance Scan Counter 23 into high speed memory 11, change SW-24 to 0. Add one to Advance Scan Counter 23.* |
| | 1 | Even | Insert into high speed memory 11 the operand whose location is given by the Addr-field of the instruction in Advance Scan Register 22. Change SW-24 to 0. |
| | 1 | Odd | Change SW-24 to 0. Do not pick up operands or index register modified instructions. |
| Data Independent Branch (Unconditional Branch) | 1 | Even | Insert into high speed memory 11 the instruction addressed by the Addr-field of Advance Scan Register 22, change Advance Scan Counter 23 to Address specified by Advance Scan Control Register 22. |
| | 1 | Odd | Stop Advance Scan. |
| Data Dependent Branch (Conditional Branch) | 1 | Even or Odd | Insert into high speed memory 11 the instruction addressed by Advance Scan Counter 23. Add one to Advance Scan Counter 23. Stop Advance Scan. |

*This and only this row applies if the instruction in Advance Scan Control Register 22 is a register operation.

Once the advance scan phase is initiated, it will be noted from Table I that the information is examined by means of the switch 24 to determine whether the information is characterized as data or an instruction. If the switch is set to the zero state it identifies the information as an instruction and we examine the type of instruction to determine whether a branching or non-branching operation is called for. Accordingly, during the interval that information is being written into the high speed memory 11 it is also inserted into the advance scan control register 22 wherein it is analyzed to determine whether the advance scan cycle is to continue or to stop.

Figure 2:
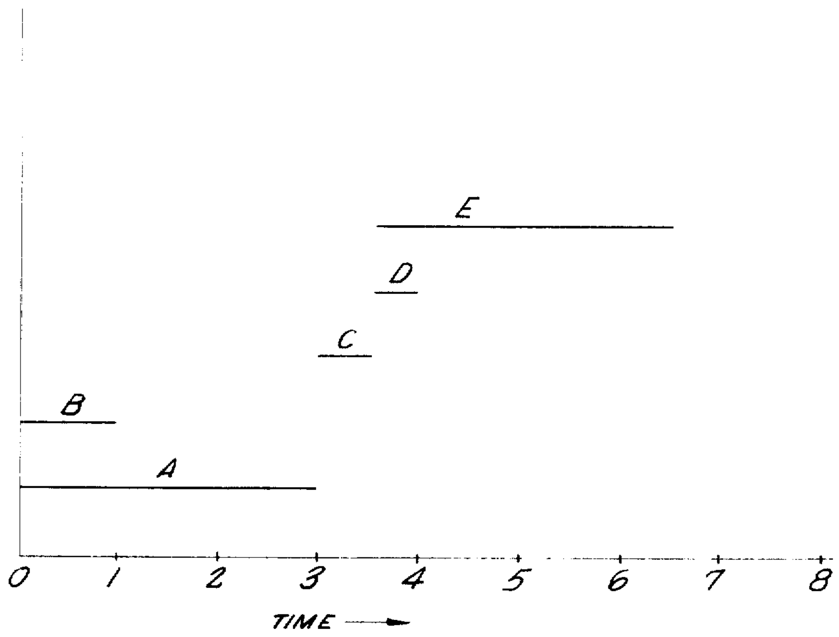
FIG. 2 is a timing chart illustrating the sequence of operations for the insertion of information into the high speed memory of the system of FIG. 1.

It should also be noted from an examination of Table I that when a data dependent branch has been encountered the instruction following branch is read into the high speed memory eleven 11 and the advance scan phase is stopped until the branch is executed. In addition, some operands of the index modified instructions are not utilized because the contents of the index register may change before this instruction is executed. The cycle of insertion and removal for the advance scan is identical to that described hereinabove for the main scan and as represented in FIG. 2.

As mentioned hereinabove, all the information is initially stored in the slow speed memory 10, while no information is stored in the high speed memory 11. Accordingly, with the sequential operation of the program The identification of the information in the high speed memory 11 is by means of the usage indicator 20 and the Y pointer 21, as described hereinabove. Accordingly, it will be appreciated that when a piece of information in the high speed memory 11 is utilized, its associated usage indicator 20 has turned on. The Y pointer 21 is controlled to indicate the word that has been in memory the longest and that has been used. When this word has been read out, then the Y pointer 21 will be stepped until it indicates the next usage indicator 20 which is on in accordance with the sequence of the Y pointer 21. There are two exceptions to this general rule, the first of which arises due to the way in which the data dependent branches are handled. Due to the possibility that the instruction following a data dependent branch may not be used, a word following a data dependent branch is inserted into the high speed memory 11 and has its associated usage indicator 20 turned on. This is conveniently done since advance scan is stopped at this point. The second exception arises because advance scan first determines whether or not the required information is already in the high speed memory 11 before it obtains it from the slow speed memory 10. If the information is already stored in the high speed memory 11, then the associated usage indicator 20 is simply turned off, as mentioned hereinabove.

The main scan and advance scan procedure will now be noted to be requesting information from the two memories in a timed relationship and which timing is controlled by the central control. The control is such that in any conflict between main and advance scan, main scan has priority.

What is claimed is:

1. A memory comprising storage means having an information storage portion and an information identification storage portion wherein a piece of information and its identification portion are stored in correlated locations in their respective storage portions, said storage means having a plurality of storage locations, a plurality of usage indicators corresponding to the plurality of storage locations with each indicator assigned to an individual storage location and having a preselected state for indicating the availability of the storage location for writing in new information and another state for indicating the storage location is in use and controllable to automatically switch in state in accordance with the memory operations on the individual storage locations, a pointer having a plurality of stable states corresponding to the plurality of storage locations in said storage means cyclically operable to successively step from an initial stable state for identifying a storage location having its usage indicator in said preselected state to another stable state for identifying the next successive storage location having its usage indicator in said preselected state and controlled to automatically point in accordance with the change in the state of a usage indicator, register means coupled to said information identification portion of said storage means for simultaneously comparing each of said identification portions for reading out the associated information or writing new information into said storage means at the storage location available therefor.

2. A memory as defined in claim 1 wherein said usage indicators each comprise a bistable switching element and said pointer comprises a cyclic counter.

3. A memory comprising storage means having an information storage portion and an information identification storage portion wherein a piece of information and its identification portions are stored in correlated physical locations in their respective portions, register means for receiving information identification signals and coupling same to said information identification portion of said storage means for simultaneously comparing all the identification information for reading out the associated information, a usage indicator for each location in said information storage portion for indicating the availability of said location for storing information or whether the information has been used by being set to a preselected state and being reset to another state upon the storage of information therein and being controlled to switch between the states in accordance with the memory operations on the individual storage locations, a storage location pointer associated with said usage indicator for indicating in a preselected "stacked" sequence the first location in said storage portion available to receive information and controlled to automatically point in accordance with the change in state of a usage indicator, and means for writing information in said information storage and information identification portions at the storage location signalled by said pointer.

References Cited by the Examiner

UNITED STATES PATENTS

| | | | |
|---|---|---|---|
| 3,031,650 | 4/1962 | Koerner | 340—174 |
| 3,121,217 | 2/1964 | Seeber | 340—174 |
| 3,199,082 | 8/1965 | Haibt | 340—172.5 |

OTHER REFERENCES

Blum, Cohen and Porter: Considerations in the Design of a Computer With High Logic-to-Memory-Speed Ratio, Proceedings of Sessions on Gigacycle Computing System, S136, presented at AIEE Winter General Meeting, New York, New York, January 29–February 2, 1962, pp. 53–63.

ROBERT C. BAILEY, *Examiner.*

R. B. ZACHE, *Assistant Examiner.*